Oct. 12, 1943.  L. E. CURRISTON  2,331,309
EMERGENCY EXIT CATAPULT
Filed Nov. 24, 1941   6 Sheets-Sheet 2
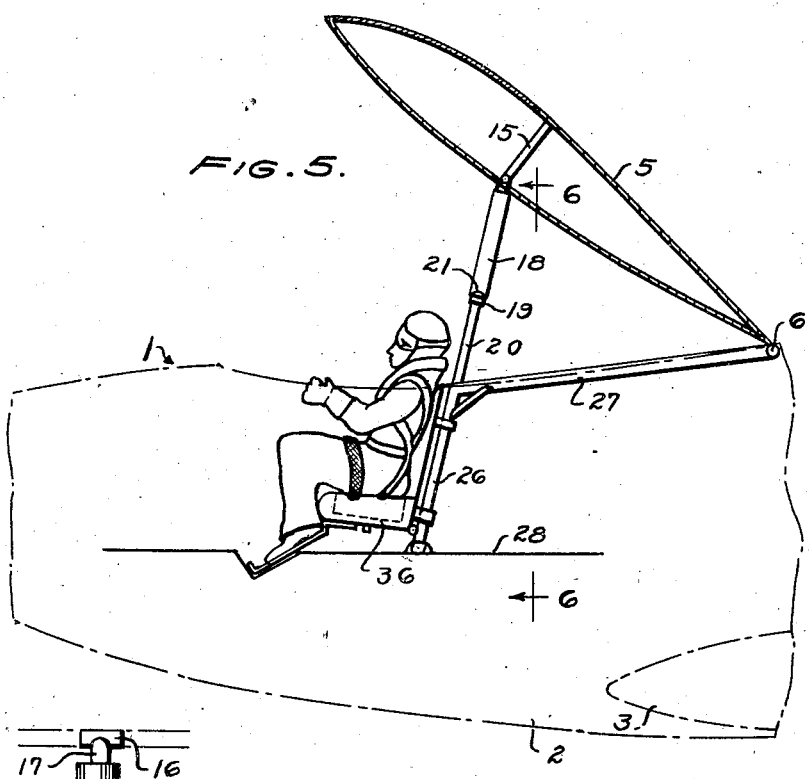
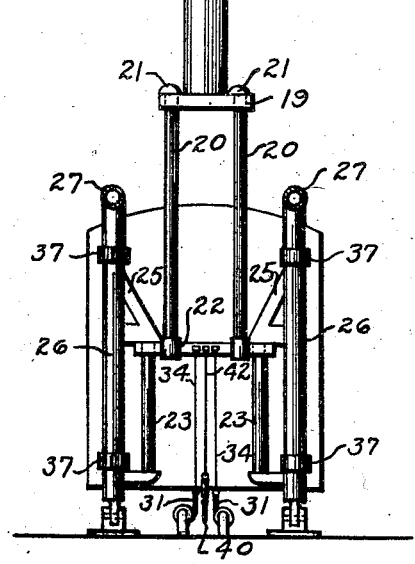
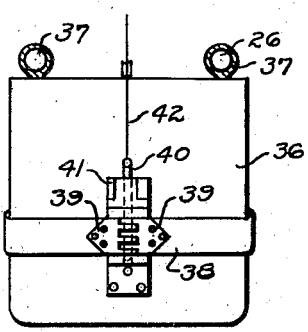
INVENTOR
LOREN E. CURRISTON Oct. 12, 1943.    L. E. CURRISTON    2,331,309
EMERGENCY EXIT CATAPULT
Filed Nov. 24, 1941    6 Sheets-Sheet 3

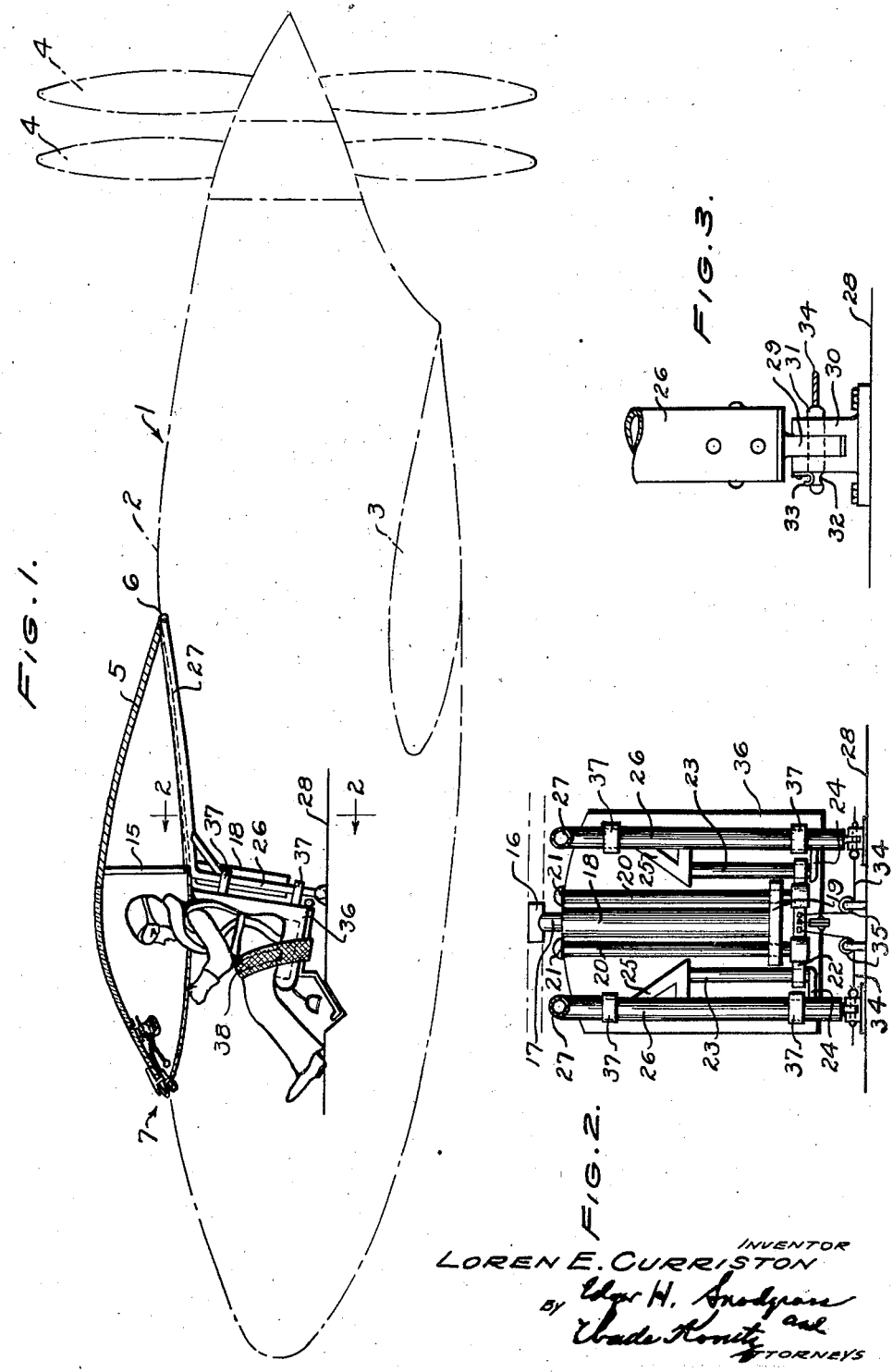

INVENTOR
LOREN E. CURRISTON
BY
ATTORNEYS

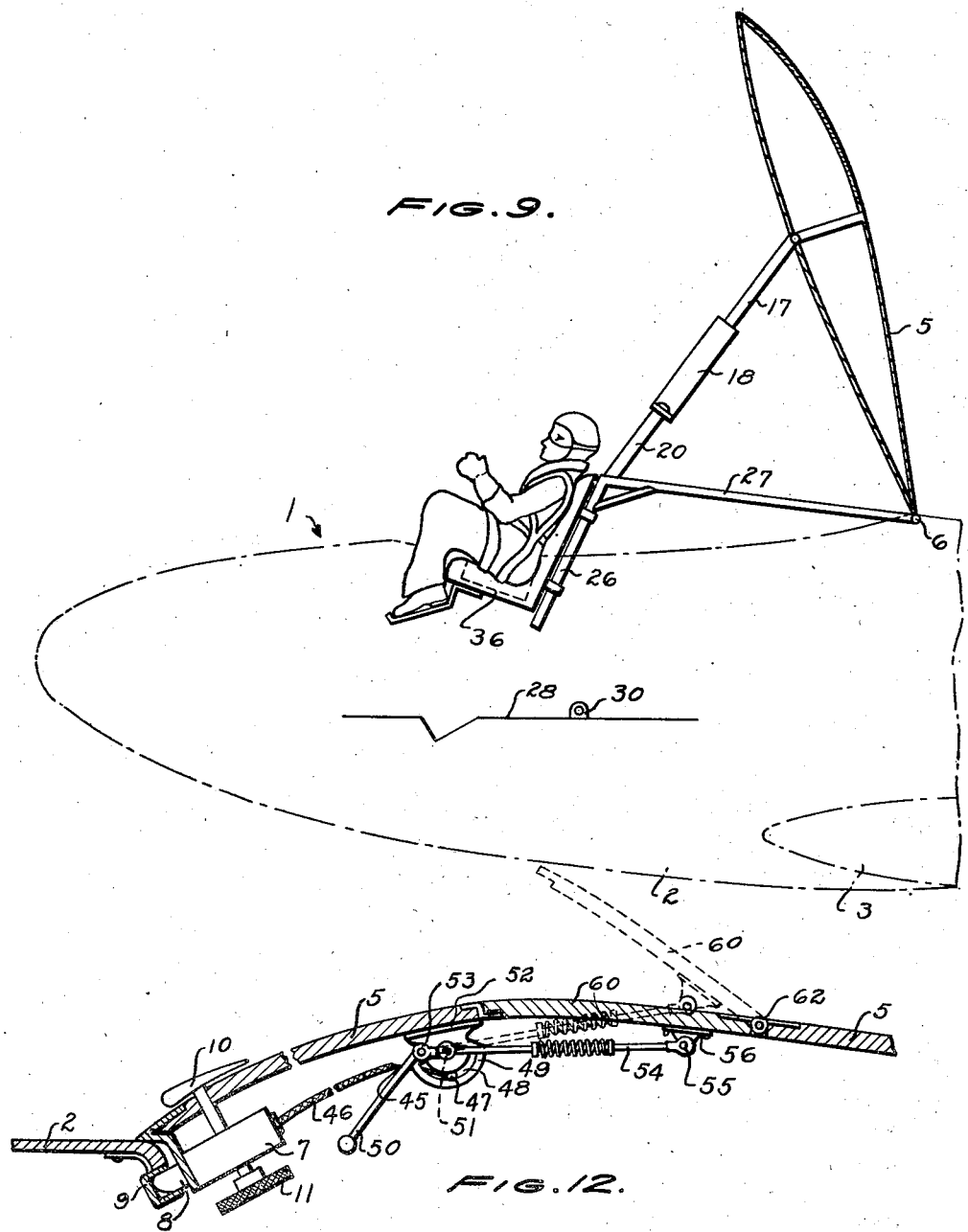

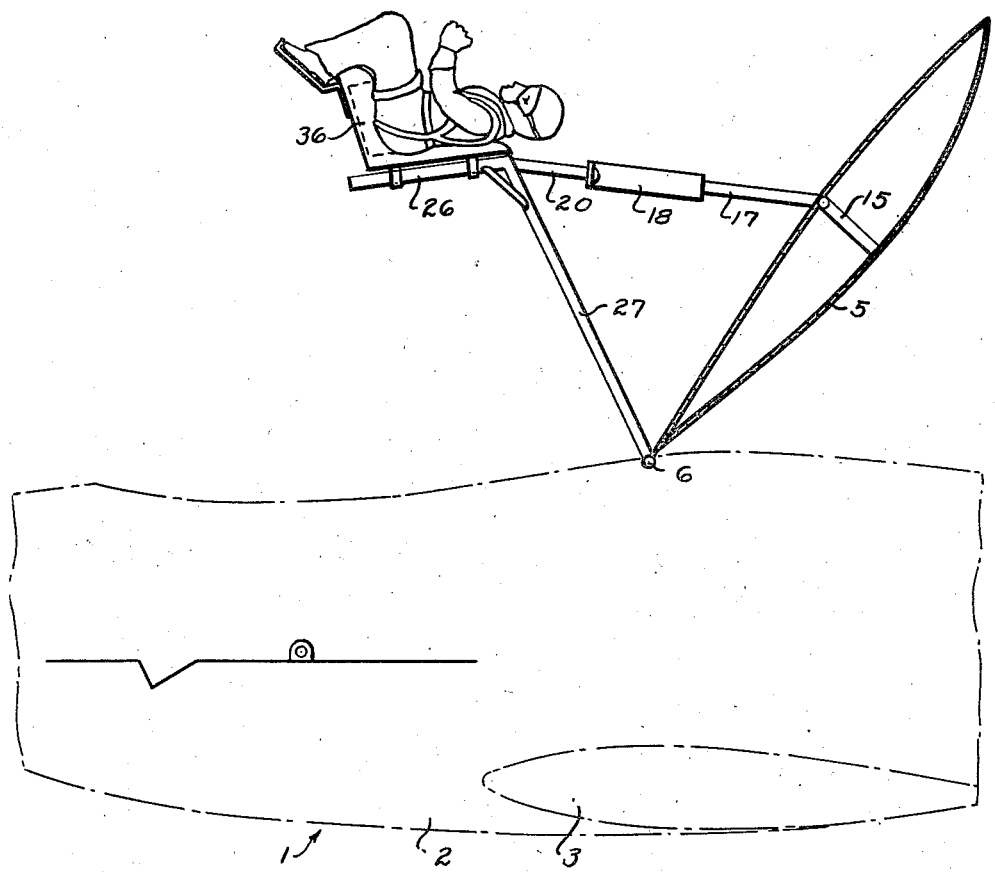

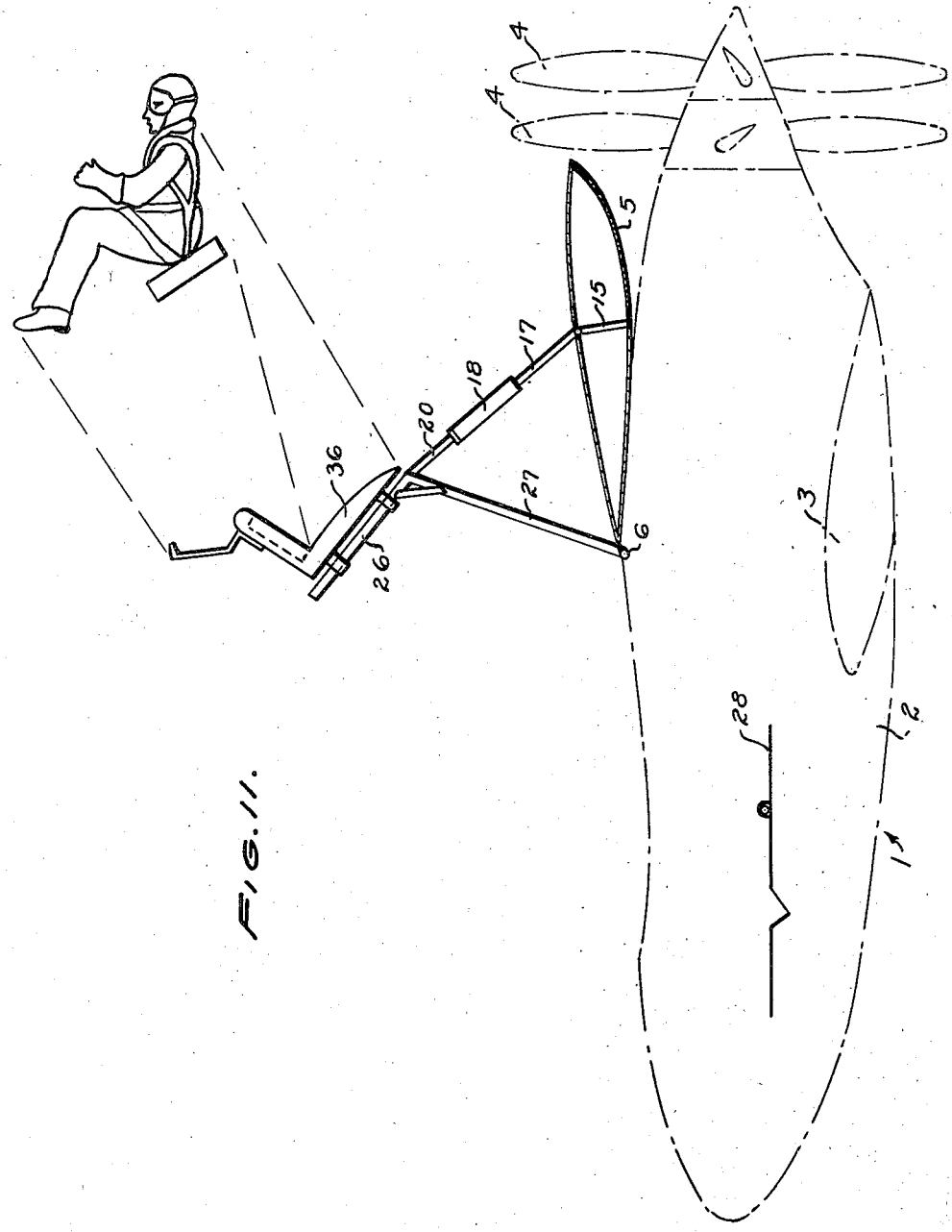

Patented Oct. 12, 1943

2,331,309

UNITED STATES PATENT OFFICE 2,331,309

EMERGENCY EXIT CATAPULT

Loren E. Curriston, Marne, Mich.

Application November 24, 1941, Serial No. 420,264

12 Claims. (Cl. 244—122)

(Granted under the act of March 3, 1883, as amended April 30, 1928; 370 O. G. 757)

The invention described herein may be manufactured and used by or for Government for governmental purposes, without the payment to me of any royalty thereon.

This invention relates to a catapult for bodily ejecting a pilot or other occupant from an aircraft in such a manner that he will clear obstructions such as pusher propeller blades and the tail surfaces.

The development of high-speed military aircraft such as fighters has greatly complicated the problem of making an emergency exit from such craft in order to use a parachute. In high-speed tractor-type airplanes the air-stream velocity is so great that a pilot can climb out of the cockpit only with great difficulty, and in some aircraft of this type a successful exit can be made only from an inverted position, the pilot literally falling out of the craft. Aircraft employing pusher propellers have been developed which from an aerodynamic standpoint possess many advantages, particularly of the type wherein the pilot is enclosed in a short streamlined nacelle or fuselage in which the engine is mounted to drive a pusher propeller, the tail surfaces being carried by spaced booms located on opposite sides of the central nacelle. In aircraft of this character, the problem of making an emergency exit is complicated by the fact of the danger of the pilot's being struck by the propellers, in addition to the usual danger of striking the tail surfaces, and this problem has retarded the adoption of this type of aircraft more than any other factor.

It has been many times proposed in the prior art to drop the pilot or other occupant of an aircraft through a door or the like located in the bottom of the fuselage, but structural limitations render such a system impracticable and it has no merit in solving the problem of emergency exit in pusher propeller type of aircraft. It has also been proposed to employ a platform to which the pilot's seat is attached, the platform being suported by a collapsible linkage and adapted to be energized by stressed springs or rubber shock cord to extend and bodily eject the pilot from the aircraft. Such a proposal is clearly impractical in view of the weight of the stressed springs or shock cord required to eject the pilot into an air stream moving in excess of 200 miles per hour, and further the stressed cables or springs are a continual source of danger. The use of compressed air or other gases as a source of energy is also prohibitive because of the weight of the apparatus required.

The device in accordance with the invention provides a solution to the above-named problems by providing the aircraft with a pivoted canopy which, for example, may have the windshield and other transparent parts formed as an integral portion thereof, the canopy being provided with a releasable lock which, when released, allows the canopy to be lifted by aerodynamic forces generated by the air stream. The canopy is pivotally connected, through the medium of a suitable shock absorber, to a catapult arm constructed of welded steel tubing or the like and pivotally connected to the fuselage framework. The pilot's seat is secured to the catapult arm, and the latter is secured at its outer end to the fuselage floor through a releasable connection. The pilot's safety belt is also provided with a releasable connection, and this connection, as well as the catapult arm connections, is automatically released by the initial movement of the canopy beyond a predetermined point.

In operation, the pilot releases the canopy, and the latter begins to lift very suddenly due to impact of the air stream, and upon a predetermined movement releases the aforementioned releasable connections, and the canopy, through the shock absorber, lifts the catapult arm and rotates the same with an increasing velocity until it passes the vertical position, then throws the pilot backward in the direction of the moving air stream with a large clearance from pusher propeller blades, if employed, and well clear of the tail surfaces. After being thrown clear of the aircraft, the pilot may use his parachute in the usual manner.

It is therefore the principal object of the invention to provide, in combination with an aircraft having a fuselage or other structure adapted to enclose the pilot, a catapult actuated by aerodynamic forces for bodily ejecting the pilot from the fuselage and throwing the pilot clear from the aircraft in the direction of the air stream and with a trajectory providing ample clearance from the aircraft propellers and tail surfaces.

A further object of the invention is the provision of an emergency exit means from high-speed aircraft, comprising, in combination with a pilot's enclosure, a pivotally mounted canopy forming a part of said enclosure, means for releasing the canopy for rotation about its pivot connections to be actuated by aerodynamic forces derived from the air stream, and a catapult including an arm pivotally mounted on the said enclosure and to which the pilot's seat is secured, a shock-absorbing connection between the canopy and the catapult arm, and releasable latching means for releasably latching the canopy and the catapult arm in an inoperative position.

Another object of the invention is the provision, in an aerodynamically actuated catapult for bodily ejecting an occupant of an aircraft therefrom, of means for releasing the aerodynamic actuating means for operation to energize the catapult, of release means normally maintaining the catapult inoperative, and of means operable by the aerodynamic means upon a predetermined movement thereof to actuate the release means for said catapult to allow the same to be actuated by the aerodynamic means.

A further object of the invention is the provision, in an emergency exit device of the character described, of means automatically actuated thereby for releasing the pilot's safety belt prior to ejecting the pilot from the aircraft.

Other objects of the invention not specifically enumerated will become apparent by reference to the detailed description hereinafter given and to the appended drawings in which:

Fig. 1 is a side elevation view showing the principal components of the invention as applied to a pusher type airplane;

Fig. 2 is a view of the seat-mounting structure and catapult arm taken on line 2—2 of Fig. 1;

Fig. 3 is a view illustrating the details of a releasable latching means;

Fig. 4 is a bottom view of the seat of Fig. 1 showing the releasable safety belt attachment;

Fig. 5 is a fragmentary view of the apparatus of Fig. 1, showing the canopy after release but prior to elevating the catapult arm;

Fig. 6 is a view similar to Fig. 2 taken on line 6—6 of Fig. 3 and illustrating the release of the catapult arm and safety belt locking means;

Fig. 9 is a view similar to Fig. 3, but showing the seat and catapult arm being lifted by the canopy;

Fig. 10 is a view similar to Fig. 9 showing a further position of the seat and catapult arm;

Fig. 11 is a view illustrating the final position of the seat and catapult arm after the pilot has been thrown from the seat; and Fig. 12 is a view illustrating a combined canopy release and lifting-flap-actuating mechanism for positively causing an initial lift of the canopy after release thereof.

Figure 7:
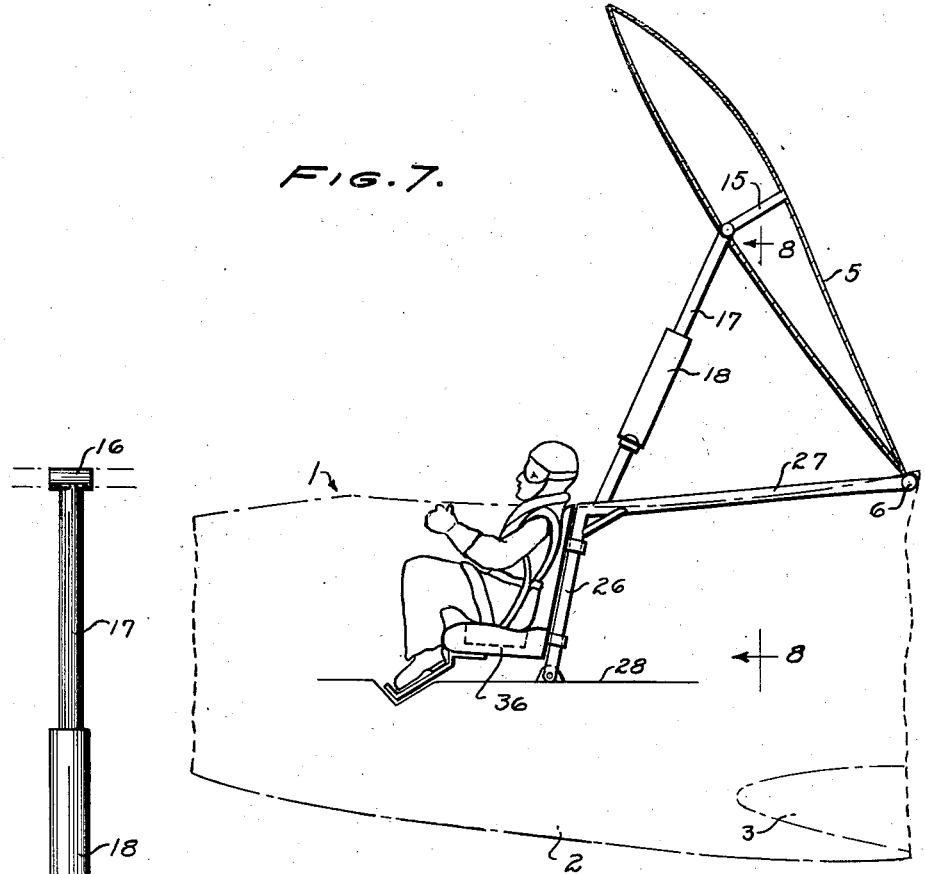
Fig. 7 is a view similar to Fig. 3 but illustrating the shock absorber connecting the canopy to the catapult arm in the fully extended position.

Referring now to Fig. 1, the reference numeral 1 generally indicates an aircraft (only the outline of a portion of which is illustrated in the drawings) having a central nacelle or fuselage 2 and a wing 3, and propelled by engine-driven pusher propellers 4, the other portions of the aircraft not being shown in the drawings.

The fuselage 2 serves, in addition to the housing of the power plant, as a cockpit enclosure for the pilot, the cockpit enclosure being provided with a canopy 5 which may, for example, incorporate the windshield, or the entire canopy may be made of suitable transparent plastic material molded in one piece. The canopy 5 is pivotally mounted on the structure of the fuselage 2 at its rear or trailing edge so as to be rotatable about an axis 6. At its forward end the canopy is adapted to be releasably latched to the fuselage by means of a releasable locking mechanism 7 (see Fig. 12) which may be operated from exterior of the aircraft for ingress into the cockpit enclosure, or may be released manually from within the cockpit while the aircraft is in flight to release the canopy so that the same may function as a flap or drag element under the influence of aerodynamic forces generated by the air stream moving exterior of the fuselage. The canopy 5 is suitably braced as at 15 so as to transmit forces through a linkage including a shock absorber 18, to a catapult arm 27 having downwardly depending portions 26 to which the pilot seat 36 is secured, the seat being provided with a releasable safety belt 38 which is released automatically, together with a latching connection between the catapult arm and the floor structure 28 of the fuselage, as will hereinafter be more particularly described.

Referring now to the detail structure of the seat and catapult arm seen in Fig. 2, the reference numeral 16 indicates a pivotal connection by which the terminal end of a shock absorber piston rod 17 is pivotally connected to the bracing structure 15 (Fig. 1) of the pivoted canopy 5. The piston rod 17 forms a part of a conventional oleo, pneumatic, or other type of shock absorber having a cylinder 18 which is provided at its lower end with a crosshead or guiding portion 19 which is freely slidable on a pair of spaced tubular guides 20, each of which is provided at its upper end with a stop 21 to limit the upward travel of the crosshead 19, the lower ends of the guides 20 being suitably journaled for limited rotary movement on a crosshead member 22 which is freely slidable on parallel spaced vertical guides 23, the latter being secured at their lower and upper ends to bracket members 24 and 25 respectively, which in turn are secured to the downwardly extending, spaced, tubular members 26 which form a part of the catapult arm. The upper brackets 25 secured to the guides 23 serve as a means to limit the upward travel of the crosshead 22, and further serve as a means for transmitting lift forces from the canopy 5 to the catapult arm including the downwardly depending leg portions 26 and the longitudinally extending members 27, which may be interconnected by means of suitable cross-bracing (not shown) and pivotally connected to the fuselage structure for rotation about the axis 6, as seen in Fig. 1. The lower ends of the catapult arm members 26 are adapted to be releasably secured to the floor 28 (Fig. 1) by means of an automatic releasable latching mechanism of the character such as illustrated in Fig. 3, in which each leg 26 of the catapult arm 27 is provided at its lower end with a lug connection 29 which is adapted to be received in a corresponding slotted lug connection 30 secured to the floor 28 of the fuselage structure of the aircraft, a removable bearing pin 31 serving to connect the lugs 29 and 30, and the bearing pin having a necked-down portion 32 at its outer end which is adapted to cooperate with a retaining spring 33 to prevent axial movement of the pin under all ordinary conditions, this structure serving as a means to maintain the catapult arm, including elements 26 and 27, normally inoperative. The pins 31 are adapted to be released by means of flexible cables 34 which pass over guide pulleys 35 and connect to the crosshead member 22 (in Fig. 2).

Referring again to Fig. 2, it will be seen that vertical movement of the crosshead member 22 will cause the cables 34 to pull out the pins 31 to thereby release the catapult arm at its outer end from any connection with the fuselage, allowing the same to rotate freely about the axis 6 (Fig. 1) under the influence of aerodynamic forces transmitted thereto from the canopy 5.

As further seen in Fig. 2, the pilot seat 36 is secured by means of fittings 37 on to the downwardly depending leg portions 26 of the catapult arm so that when the arm is released the seat will be elevated out of the cockpit enclosure. Simultaneously with the release of the latching pins 31 for the catapult arm, the safety belt 38 (Fig. 1) is also automatically released from connection with the pilot's seat in the manner as indicated in Fig. 4.

As seen in Fig. 4, the safety belt 38 has each end thereof terminating in a hinge fitting 39, which fittings are adapted to be interconnected by means of a removable hinge pin 40 which is movably supported by means of a slotted lug 41 mounted on the bottom of the seat 36 and similar to the lug 30 in Fig. 3, the pin preferably being provided with a retaining spring (not shown) of the same character as indicated in Fig. 3. The pin 40 is adapted to be withdrawn from hinge connections 39 and fitting 41 to thereby release the safety belt by means of a cable 42 which passes over a guide pulley 43 mounted on the seat 36, the upper end of the cable 42 being connected to the crosshead member 22 for actuation thereby so that the safety belt 38 is releasably detached from its connection with the seat 36 at the same time that the catapult arm is released by withdrawal of pins 31.

*Operation*

While the aircraft is on the ground, the latch generally indicated at 7 (Fig. 1) may be released and the canopy lifted to permit ingress into the cockpit enclosure of the fuselage 2, since lost motion permitted by the travel of crossheads 19 and 22 on respective guides 20 and 23 will allow a considerable elevation of the canopy without withdrawing the latching pins 31 and 40 (Figs. 3 and 4). After entry into the aircraft, the canopy 5 is again latched, and if during flight the pilot has occasion to make an emergency exit from the aircraft, he simply releases the latching means 7, which permits the canopy to be lifted by aerodynamic forces derived from the air stream and moved to a position such as illustrated in Fig. 5, in which the shock absorber elements 17 and 18 are temporarily inactive and the crosshead 19 is moved freely upward on the guides 20 until it engages the stop members 21 thereon. Canopy forces are then transmitted to the crosshead 22 which, as seen in Fig. 6, moves to its extreme upward limit to engage the stop members 25 and thus transmits force to the catapult arm including members 26 and 27. In its upward travel the crosshead 22 exerts sufficient force on the cables 34 and 42 to withdraw the pins 31 and 40 respectively, to thereby release the catapult arm from connection at its forward end to the floor 28 (Fig. 5) and to release the safety belt 38 from connection with the seat 36, and thus allows the forces to be transmitted directly from the canopy through the shock absorber 18 to the catapult arm and seat, to elevate the same.

Figure 8:
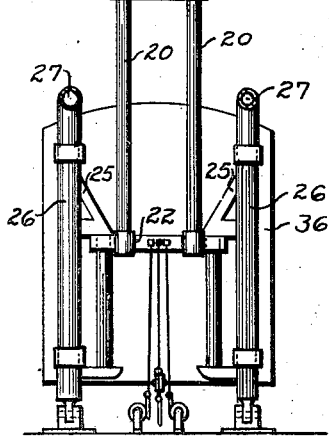
Fig. 8 is a view taken on line 8—8 of Fig. 7.

As seen in Figs. 7 and 8, the canopy, after having moved to the open position and having transmitted sufficient force to elevate the crosshead 22 to release the latching pins 31 and 40, then transmits force directly to the catapult arm elements 26 and 27 which, however, are restrained from moving by the weight of the pilot acting downwardly on the seat 36, and the shock absorber elements 17 and 18 thus go into action to cushion the shock load and to more gradually transmit the force from the moving canopy to the catapult arm and thus prevent the transmission of excessive acceleration force to the pilot's body; and by the time the shock absorber piston has moved to its full travel, sufficient force will be built up to start the elevation of the catapult arm, which then starts to rotate about the axis 6, lifting the pilot out of the cockpit enclosure in the manner as seen in Fig. 9. After having once accelerated the pilot into motion, the accelerating force constantly increases until the canopy 5 reaches a substantially vertical position, by which time the pilot is elevated from the cockpit into the position such as shown in Fig. 10, the air stream forces acting on the canopy 5 causing continued rotation thereof along with the catapult arm elements 26 and 27 and seat 36 until the pilot is hurled from the seat in an inverted position such as illustrated in Fig. 11, the pilot being thrown clear of the aircraft in the direction of the moving air stream, thus considerably lessening the shock of ejection into the fast moving air stream. As noted in Fig. 11, the trajectory of the pilot's body after being catapulted from the aircraft, is such that he has a large clearance from the propellers 4, thereby eliminating any possible danger of striking the propellers, and similarly the pilot will have ample clearance from the passing tail surfaces.

A further feature is the fact that when once released, the canopy 5—due to its aerodynamic drag—will, when fully open, cause a torque on the aircraft tending to cause the nose of the same to be elevated so that further clearance of the pilot's body is ensured at the time he is catapulted past the plane of the propellers 4 and the aircraft tail surfaces.

Under certain circumstances, due to the air flow over the fuselage in the vicinity of the canopy 5 in certain types of designs, large positive pressures may exist over the forward portion of the canopy such that, even though the same were released, difficulty would be encountered in elevating the same to allow air to enter and strike the underneath portions thereof, and where wind tunnel tests of the model indicate such pressure distributions may occur, a positive opening means may be provided to cooperate with the releasing mechanism such as illustrated in Fig. 12.

As seen in Fig. 12, the latching means 7, of the same character as shown in Fig. 1, is preferably made in the form of a common door latch having a slidable bolt 8 which may cooperate with a catch 9 to positively lock the canopy 5 to the fuselage structure 2, the lock 7 being provided with an exterior operating handle 10 by which the canopy may be released for lifting the same to gain entrance to the cockpit enclosure, and also adapted to be manually released by means of a knob 11 located within the cockpit enclosure. The locking means 7 is also provided with an additional opening means adapted to withdraw the bolt 8 from the catch 9 independently of the handles 10 and 11, by means of a push-pull control cable 45 housed in a guiding sheath 46, the cable 45 at its outer end being provided with a suitable actuating pin 47 which is freely slidable in an arcuate lost-motion slot 48 cut into a lever 49 integrally formed with a long, manually actuated lever 50, which is pivotally supported as at 51 on a mounting lug 52 secured to the canopy 5. Between its ends the manually actuated lever 50 is pivotally connected as at 53 to a resilient link 54 which is pivotally connected at its outer end at 55 to a lever 56 secured to a movable flap 60 hinged as at 62 to the canopy 5, the flap 60 serving as a spoiler, or second aerodynamic flap, which, when open to the position shown in dotted lines, will cause a sufficient lifting force on the canopy 5 as a whole to elevate the front end of the canopy sufficiently to allow the free access of the air stream thereunder.

When the pilot wishes to make an emergency exit with a canopy employing the pivoted flap 60, he pulls down on the outer end of the lever 50, causing the same to rotate about its pivot 51 and to transmit force to the flap 60 in an opening direction through the resilient link 54, which allows a sufficient resilient motion that the center line of the link 54 may pass through the dead center position of link 50. The force transmitted through the link 54 is sufficiently multiplied by the lever combination that the flap 60 is elevated at its forward edge sufficiently to allow the impingement thereof on the moving air stream, and the flap can thus be readily moved to its limiting position. Shortly prior to the flap 60's having moved to its extreme position, the pin 47 will have reached the end of the arcuate lost-motion slot 48 in the lever 49, so that cable 45 will cause a release of the bolt 8 of the locking mechanism 7 from the cooperating catch 9 and thus release the forward end of the canopy 5 for free rotation about the pivotal axis 6 (Fig. 1) due to the aerodynamic forces created by means of the flap or spoiler 60. Since the lifting force exerted by the flap 60 has elevated the forward edge of the canopy 5, the moving air stream passes thereunder and exerts a very large drag force tending to lift the canopy about the axis 6, and the aerodynamic forces increase as the canopy opens toward the full open position. By incorporating the windshield and canopy in a unitary structure no larger than now employed on conventional aircraft, the forces available for accelerating the pilot and ejecting him by the catapult arm may easily amount to three to four times the weight of the average pilot, giving a very considerable accelerating force available for actuation of the catapult and yet adding only slightly to the actual weight of the aircraft.

It is to be understood that the catapult arm and elevating structure need not necessarily be made in the form of the pivoted arm as shown, and it is further understood that any desired type of locking mechanism may be employed, and further it is obvious that, although the invention has been illustrated as applied to pusher propelled type of aircraft, the pivoted canopy may be applied to single-seat, high-speed aircraft of the tractor-propelled type without any change from the structure as illustrated in, for example, Fig. 1; and it is to be understood that the emergency exit means in accordance with the invention is not to be limited to any specific type of aircraft.

While a preferred embodiment of the invention has been illustrated and described, many variations therein will become apparent to those skilled in the art as falling within the scope of the invention as defined by the appended claims.

I claim:
1. An emergency exit device for aircraft having a portion thereof forming an enclosure for the pilot or other occupant, comprising in combination with said enclosure, a pivoted flap adapted when released to be acted upon by aerodynamic drag forces derived from the air stream, means for maintaining said flap in a normal inoperative position and releasable at will to be acted upon by said aerodynamic forces, a catapult arm pivotally connected at one end thereof to the structure of said aircraft forming said enclosure, a seat secured to said arm adjacent the outer end thereof, means for releasably latching said arm to the aircraft structure, and a connection between said flap and said arm, whereby the release and aerodynamic actuation of said flap cause rotation of said catapult arm and seat to thereby positively eject the occupant of the seat from the aircraft and throw the said occupant clear of all parts of the aircraft and in the direction of the moving air stream.

2. The structure as claimed in claim 1, in which the connection between said flap and said catapult arm includes a lost-motion connection permitting a predetermined movement of said flap before transmitting forces to said arm, and a shock absorber operative to cushion the impact loads transmitted through said connection.

3. The structure as claimed in claim 1, in which the connection between the flap and the catapult arm includes a lost-montion device permitting a predetermined movement of said flap before transmitting forces to said arm, and means operatively interconnecting the releasable latching means for said catapult arm and said flap and operative during the said predetermined movement of the flap to actuate the latching means for said arm to release the same to be actuated by the flap.

4. An emergency exit device for bodily ejecting the occupant of an aircraft during flight from a cockpit enclosure thereof, comprising a catapult including a seat for the occupant of said cockpit, means for elevating said seat out of said cockpit and thereafter moving said seat in a direction so as to throw the occupant thereof clear of the aircraft with an appreciable velocity in the same direction as the air stream, releasable means for normally maintaining said elevating means inoperative, a movable drag element, means controlled at will for releasing said drag element to be actuated by the air stream, and an operative connection between said elevating means and said drag element whereby said elevating means is energized by said drag element.

5. An emergency exit device for aircraft comprising, in combination with the fuselage or other means forming a cockpit enclosure, a pivoted canopy over said cockpit forming together with said fuselage a streamlined cabin enclosure, means actuated at will for releasing said canopy for rotational movement about its pivots under the influence of aerodynamic forces derived from the air stream in flight, a seat within said cockpit enclosure including a releasable safety belt, an arm secured to said seat at one end thereof and the other end of said arm being pivotally connected to the fuselage structure, releasable latching means for normally maintaining said arm and seat immovable, a linkage connecting said pivoted canopy and said arm, said linkage including a lost-motion device permitting an initial predetermined movement of said canopy without transmitting force to said arm, and means for simultaneously releasing said safety belt and said releasable latching means and actuated by said pivoted canopy during the said initial predetermined movement thereof, said arm upon the release thereof being rotated by the forces transmitted thereto from said canopy to elevate said seat out of said cockpit enclosure and to catapult the occupant thereof clear of the aircraft in a direction opposite the direction of flight.

6. An emergency exit device for high-speed aircraft having means providing a cockpit enclosure for the pilot, a pivoted canopy forming with said cockpit enclosure a closed cabin, said canopy being releasable at its forward end to permit entrance and exit to the cockpit on the ground and when released during flight constituting an aerodynamic drag element, a pilot's seat within said cockpit enclosure, means secured to said seat and connected to the structure of the aircraft for elevating said seat in an upward and rearward path out of said cockpit enclosure, releasable means for normally maintaining said seat immovable with respect to said cockpit enclosure, and linkage connecting said canopy to the means secured to said seat, whereby a predetermined movement of said canopy, due to aerodynamic forces acting thereon causes elevation of said seat upward and out of said cockpit enclosure.

7. The structure as claimed in claim 6, in which the linkage connecting the canopy to the means for elevating the seat is provided with a lost-motion device permitting a predetermined movement of said canopy before the same transmits force to said seat-elevating means, and means actuated by said canopy operatively connected to said seat-releasing means to actuate the same during the said predetermined movement of the canopy.

8. The structure as claimed in claim 6, in which said seat is provided with a safety belt, a releasable means detachably securing said safety belt to the seat, a lost-motion device in said linkage permitting a predetermined free movement of said canopy before force is transmitted through said linkage, and means actuated by said canopy operatively connected respectively to said seat-releasing means and to said safety-belt-releasing means for simultaneously releasing the seat and safety belt during the said predetermined movement of the canopy.

9. A device for catapulting the occupant of an aircraft from the fuselage thereof during flight, comprising a seat, releasable elevating means secured to said seat and pivotally connected to said aircraft fuselage for elevating the seat upward and outward from the fuselage, a canopy pivotally connected at its trailing edge to the fuselage and forming a portion of the fuselage cockpit enclosure, said canopy being releasably latched adjacent its forward marginal edge to the fuselage so that when released it is lifted by aerodynamic forces derived from the moving air stream, and means interconnecting said elevating means and said pivoted canopy whereby said elevating means is released and energized by the movement of said canopy after the release thereof.

10. The structure as claimed in claim 9, in which said pivoted canopy is provided with an aerodynamic spoiler pivotally mounted thereon and means for moving said spoiler into a position where it will be subjected to the impact of the air stream in flight, said spoiler having an area such that when moved into the air stream sufficient lifting force will be produced to lift the forward end of the pivoted canopy, after the latter has been released, so that the impact of the air stream on the canopy will cause rotation of the same about its pivotal axis.

11. The structure as claimed in claim 9, in which said pivoted canopy is provided with an aerodynamic spoiler pivotally mounted thereon and adapted to be moved into the air stream during flight, means for actuating said spoiler, and operating means interconnecting the release means for said canopy and said spoiler-actuating means, actuation of said operating means causing simultaneous release of said canopy and movement of said spoiler into the air stream and the area of the latter being such that the lifting forces created by impact of the air stream thereon will lift the forward end of the canopy sufficient that the canopy will thereafter be moved directly by the impact of the air stream.

12. An emergency exit catapult device for aircraft, including a catapult arm pivotally secured to the aircraft structure, a seat mounted on said catapult arm, means for releasing said seat and arm for movement in an upward and rearward direction, and releasable aerodynamic means for energizing said catapult arm by forces derived from the air stream in flight, the said catapult arm throwing the occupant in a substantially inverted position clear of all parts of the aircraft and in the direction of the moving air stream.

LOREN E. CURRISTON.